(12) United States Patent
Clarke et al.

(10) Patent No.: US 7,596,872 B2
(45) Date of Patent: *Oct. 6, 2009

(54) CUTTING ATTACHMENT WITH A REMOVABLE COVER FOR ROTARY HAND TOOLS

(75) Inventors: David A. Clarke, Chicago, IL (US); Garth W. Prince, Chicago, IL (US)

(73) Assignee: Robert Bosch GmbH, Stuttgart (DE)

( * ) Notice: Subject to any disclaimer, the term of this patent is extended or adjusted under 35 U.S.C. 154(b) by 465 days.

This patent is subject to a terminal disclaimer.

(21) Appl. No.: 11/494,117

(22) Filed: Jul. 27, 2006

(65) Prior Publication Data

US 2008/0022537 A1 Jan. 31, 2008

(51) Int. Cl.
  *B23D 57/00* (2006.01)
  *B23D 45/16* (2006.01)
(52) U.S. Cl. .................. 30/391; 30/388; 451/358; 411/353
(58) Field of Classification Search .......... 30/373, 30/388, 390, 391; 144/136.95, 154.5; 411/353; 451/358
See application file for complete search history.

(56) References Cited

U.S. PATENT DOCUMENTS

| | | | |
|---|---|---|---|
| 1,378,258 A | 5/1921 | Manderfield |
| 1,806,582 A | 5/1931 | Beutner |
| 2,248,694 A | 7/1941 | Boyette |
| 2,532,982 A | 12/1950 | DeYoung |
| 2,610,658 A | 9/1952 | Koeling |
| 2,705,513 A | 4/1955 | Moeller |
| 2,741,282 A | 4/1956 | Wieting |
| 3,111,969 A | 11/1963 | Bivens |
| 3,177,909 A | 4/1965 | Laube et al. |
| 3,466,973 A | 9/1969 | Rees |
| 3,613,748 A | 10/1971 | De Pue |
| 3,711,998 A | 1/1973 | Mason |
| 3,716,917 A | 2/1973 | Ruben |
| 3,730,239 A | 5/1973 | Kaman et al. |

(Continued)

FOREIGN PATENT DOCUMENTS

EP 1454710 9/2004

(Continued)

*Primary Examiner*—Hwei-Siu C Payer
(74) *Attorney, Agent, or Firm*—Greer, Burns & Crain, Ltd.

(57) ABSTRACT

Embodiments of an accessory attachment for a rotary power hand tool are disclosed wherein the hand tool is of the type which has a tool housing with a preferably cylindrical nose portion, a motor having a motor drive shaft with a mounting coupling extending forwardly from the nose portion for receiving a drive shaft, the attachment including a housing having a first end portion configured to be mounted to the tool housing nose portion and an input shaft for coupling to the motor drive shaft, and having an enlarged second end portion oriented at a right angle relative to the first end portion and also having an output shaft coupled to the input shaft at a preferably right angle relative thereto, a rotary cutting wheel mounted to the output shaft and substantially disposed within the enlarged second end portion, excepting an exposed portion of the rotary cutting wheel for engaging a work surface, and a removable cover configured to engage said enlarged second end portion to at least partially enclose said rotary cutting wheel therebetween.

21 Claims, 9 Drawing Sheets

U.S. PATENT DOCUMENTS

| | | |
|---|---|---|
| 3,805,639 A | 4/1974 | Peter |
| 3,873,862 A | 3/1975 | Butler |
| 4,010,670 A | 3/1977 | Lejdegard |
| 4,022,182 A | 5/1977 | Lenkevich |
| 4,241,505 A | 12/1980 | Bodycomb, Jr. et al. |
| 4,281,457 A * | 8/1981 | Walton, II .................... 30/124 |
| 4,318,224 A | 3/1982 | Getts |
| 4,324,163 A | 4/1982 | LaVelle |
| 4,353,165 A | 10/1982 | Albery |
| 4,414,743 A | 11/1983 | Pioch et al. |
| 4,450,627 A | 5/1984 | Morimoto |
| 4,516,324 A | 5/1985 | Heininger, Jr. et al. |
| 4,545,121 A | 10/1985 | Armbruster |
| 4,555,849 A | 12/1985 | Ando et al. |
| 4,589,208 A | 5/1986 | Iwasaki et al. |
| 4,627,774 A | 12/1986 | Bradley |
| 4,739,745 A | 4/1988 | Browning |
| 4,856,394 A | 8/1989 | Clowers |
| 4,889,025 A | 12/1989 | Collett |
| 4,972,588 A | 11/1990 | Briach, Sr. |
| 4,972,589 A | 11/1990 | Povleski |
| 4,979,307 A | 12/1990 | Ste. Marie |
| 5,005,295 A | 4/1991 | Fushiya |
| 5,012,582 A | 5/1991 | Bristol et al. |
| 5,023,999 A | 6/1991 | Looper et al. |
| 5,084,972 A | 2/1992 | Waugh |
| 5,327,649 A | 7/1994 | Skinner |
| 5,430,944 A | 7/1995 | Shilling |
| 5,439,413 A | 8/1995 | Lagler |
| 5,531,147 A | 7/1996 | Serban |
| 5,537,748 A | 7/1996 | Takahashi et al. |
| 5,542,183 A | 8/1996 | Allison |
| 5,637,035 A | 6/1997 | Yee |
| 5,657,804 A | 8/1997 | Lee |
| 5,675,895 A | 10/1997 | Mori et al. |
| 5,784,789 A | 7/1998 | Vargas |
| 5,815,932 A | 10/1998 | Presher et al. |
| 5,881,784 A | 3/1999 | Morikawa et al. |
| 5,947,805 A | 9/1999 | Van Osenbruggen |
| 5,974,674 A | 11/1999 | Kelly |
| 5,988,240 A | 11/1999 | Markus |
| 6,021,826 A | 2/2000 | Daniell |
| 6,042,311 A | 3/2000 | Yokoyama et al. |
| 6,048,260 A | 4/2000 | Kopras |
| 6,059,503 A * | 5/2000 | Johnson ...................... 411/353 |
| 6,260,591 B1 | 7/2001 | George et al. |
| 6,280,309 B1 | 8/2001 | Van Osenbruggen |
| 6,298,762 B1 | 10/2001 | LaRue et al. |
| 6,449,852 B1 | 9/2002 | Simantel |
| 6,467,990 B1 * | 10/2002 | Kremsler et al. ......... 403/408.1 |
| 6,588,111 B2 | 7/2003 | Williams |
| 6,622,762 B2 | 9/2003 | Bergner et al. |
| 6,625,891 B2 | 9/2003 | Stielper |
| 6,676,347 B2 | 1/2004 | Jensen |
| 6,678,960 B2 | 1/2004 | Williams |
| 6,755,597 B2 | 6/2004 | Bergner et al. |
| 6,757,982 B2 | 7/2004 | Refson |
| 6,767,198 B2 | 7/2004 | Weinstein et al. |
| 6,826,992 B1 | 12/2004 | Huang |
| 6,866,568 B1 | 3/2005 | Liao |
| 6,868,757 B2 | 3/2005 | Hufnagle et al. |
| 6,874,493 B2 | 4/2005 | Glenn |
| 6,877,410 B2 | 4/2005 | Gass et al. |
| 6,915,796 B2 | 7/2005 | Sung |
| 6,920,814 B2 | 7/2005 | Gass et al. |
| 6,935,940 B2 | 8/2005 | Skeem et al. |
| 6,978,548 B2 | 12/2005 | Whited et al. |
| 6,997,085 B2 | 2/2006 | Yamamoto |
| 7,000,523 B2 | 2/2006 | Mori et al. |
| 7,014,403 B1 | 3/2006 | Higganbotham et al. |
| 7,017,677 B2 | 3/2006 | Keshavan et al. |
| 7,021,399 B2 | 4/2006 | Driessen |
| 7,033,258 B2 | 4/2006 | Jordan |
| 7,044,701 B2 | 5/2006 | Herb |
| 7,047,585 B2 | 5/2006 | Bayer et al. |
| 7,051,624 B2 | 5/2006 | Oleszek |
| 7,052,382 B2 * | 5/2006 | Baker ........................ 451/344 |
| 7,077,736 B2 | 7/2006 | Uzumcu |
| 7,198,445 B2 * | 4/2007 | Kramer ...................... 411/155 |
| 7,310,879 B1 * | 12/2007 | Clarke et al. .................. 30/122 |
| 2002/0182032 A1 * | 12/2002 | Anderson et al. ........... 411/533 |
| 2004/0060178 A1 | 4/2004 | Willer |
| 2005/0155233 A1 | 7/2005 | Chen |

FOREIGN PATENT DOCUMENTS

| | | |
|---|---|---|
| WO | WO 2007/059604 | 5/2007 |
| WO | WO 2008/013680 A1 * | 1/2008 |

* cited by examiner

CUTTING ATTACHMENT WITH A REMOVABLE COVER FOR ROTARY HAND TOOLS

CROSS REFERENCE TO RELATED APPLICATIONS

This application is related to CUTTING ATTACHMENT HAVING AN ADJUSTABLE FOOT FOR ROTARY HAND TOOLS, by David Clarke and Garth W. Prince, filed on even date herewith Jul. 27, 2006 and given Ser. No. 11/494,119, now U.S. Pat. No. 7,310,879 which is specifically incorporated by reference herein.

BACKGROUND OF THE INVENTION

The present invention relates to small rotary hand tools, and more specifically to cutting attachments for such rotary hand tools.

Undercut saws, or flush cut "jamb" saws, are used to trim door jambs, baseboards and the like, to provide sufficient room to install materials, such as wood flooring, carpeting and tile, underneath the jambs and baseboards. There are many undercut saws on the market, but all known saws are dedicated tools, in that they have few uses other than making the flush cuts for which they were designed. While this exclusive use is welcomed by artisans who use undercut saws on a regular basis and who want a tool that is rugged and dependable, there are many woodworkers and occasional users that would welcome having a tool with multiple uses, including performing flush cuts.

Small rotary hand tools of the type that are marketed under the Dremel® and Roto-Zip® brands, for example, typically include a generally cylindrical housing that encloses only a motor with a rotary output shaft extending from the nose end and a nose portion that is configured to connect to various accessories or attachments. This simplicity affords tremendous versatility, because it is capable of performing a multitude of additional tasks depending on the particular accessory attachment that is attached to the tool.

Additionally, there has been continued innovation and improvement in the design of accessories for such hand tools, particularly with regard to the attachment of accessories that promote a particular, specialized function of the rotary hand tool.

SUMMARY OF THE INVENTION

Embodiments of an accessory attachment for a rotary power hand tool are disclosed wherein the hand tool is of the type which has a tool housing with a preferably cylindrical nose portion, a motor having a motor drive shaft with a mounting coupling extending forwardly from the nose portion for receiving a drive shaft, the attachment including a housing having a first end portion configured to be mounted to the tool housing nose portion and an input shaft for coupling to the motor drive shaft, and having an enlarged second end portion oriented at a right angle relative to the first end portion and also having an output shaft coupled to the input shaft at a preferably right angle relative thereto, a rotary cutting wheel mounted to the output shaft and substantially disposed within the enlarged second end portion, excepting an exposed portion of the rotary cutting wheel for engaging a work surface, and a removable cover configured to engage said enlarged second end portion to at least partially enclose said rotary cutting wheel therebetween.

DETAILED DESCRIPTION OF THE INVENTION

Figure 1:
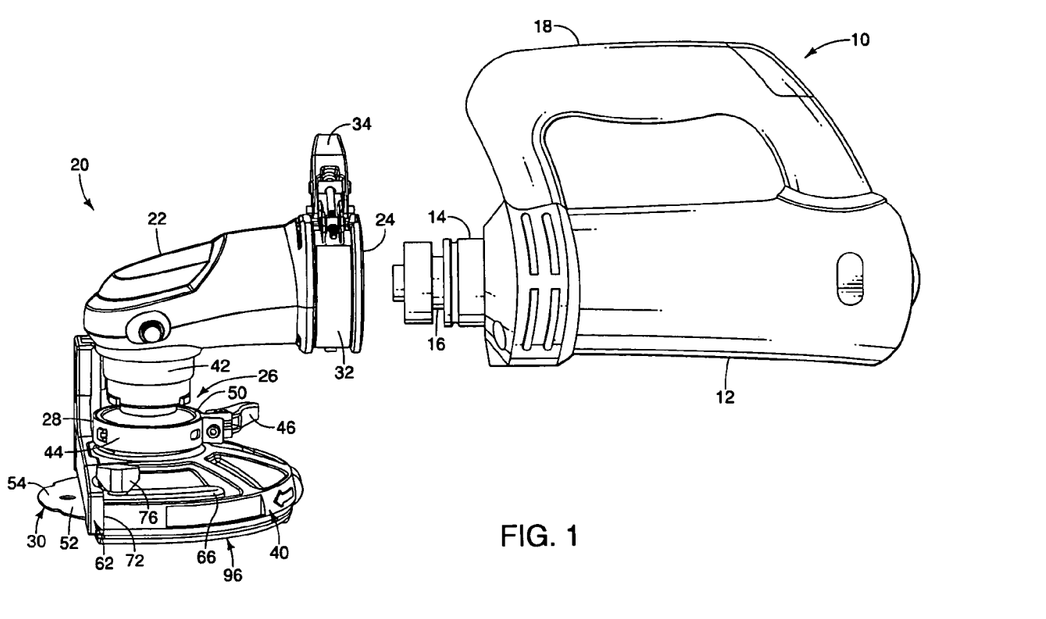
FIG. 1 is a side elevational view of a preferred accessory cutting attachment with an exemplary rotary hand tool.
Figure 2:
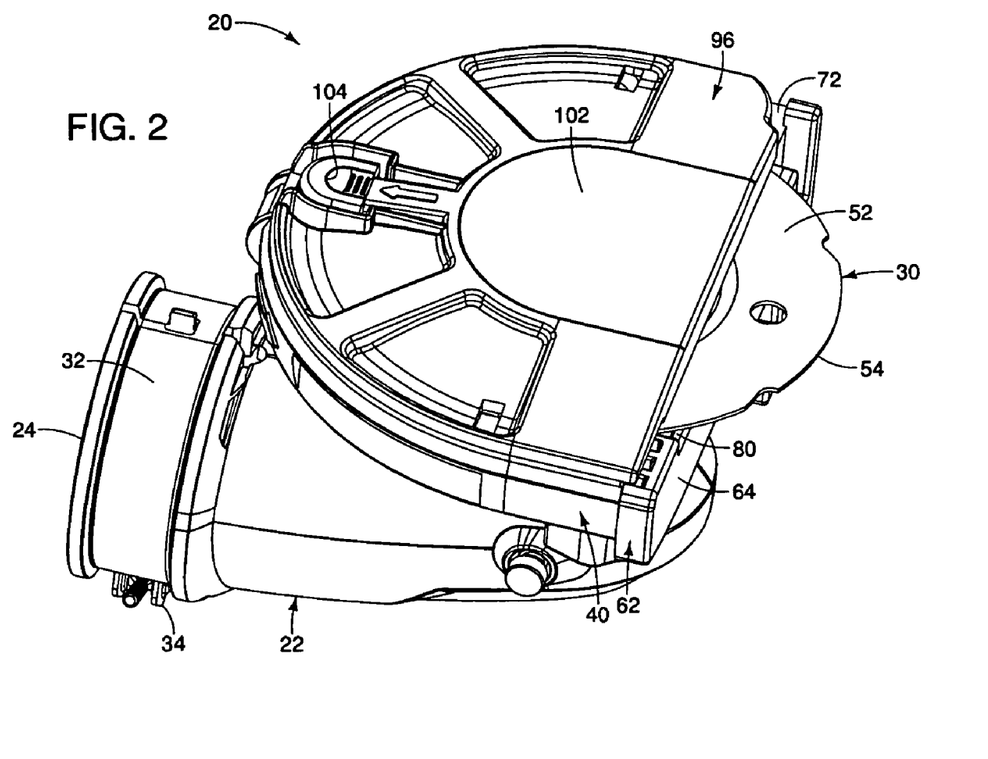
FIG. 2 is a bottom perspective view of the accessory cutting attachment of FIG. 1.

Embodiments of the invention include an accessory cutting attachment for a rotary hand tool that promotes a variety of cutting applications. While it is contemplated that the accessory cutting attachment may include mounting features configured to engage a variety of rotary hand tools, FIG. 1 illustrates an exemplary rotary hand tool, designated generally at 10, to which the preferred embodiment of the attachment may be coupled. For example, the rotary hand tool 10 may be of the type as those marketed under the Dremel® and Roto-Zip® brands made by the Robert Bosch Tool Corporation of Mount Prospect, Ill.

Generally, as illustrated in FIG. 1, the rotary hand tool 10 is a powered rotary hand tool of the type that includes a generally cylindrical housing 12 preferably made of a rugged, impact resistant plastic material and having a substantially cylindrical nose portion 14. Enclosed within the housing 12 is a motor (not shown) that drives a motor output shaft 16 that extends through and from the nose portion 14. A detachable handle 18 is also optionally provided with the hand tool 10.

FIGS. 1-7 illustrate an accessory cutting attachment, designated generally at 20, according to a preferred embodiment of the invention. The preferred cutting attachment 20 includes features promoting coupling of the cutting attachment with the rotary hand tool 10. Advantageously, the preferred cutting attachment 20 also includes a variety of features enabling a user to perform a multitude of cutting applications. For example, when coupled to the rotary hand tool 10, the preferred cutting attachment 20 may be used for various undercutting applications, including door jamb cutting, as well as trim and base board cutting for a predetermined adjustable depth, for example as much as approximately ¾ inch. Additionally, the preferred cutting attachment 20 includes features that promote use of the cutting attachment as a circular saw when used in a vertical or other angled orientation.

More particularly, the preferred accessory cutting attachment 20 includes an attachment housing, designated generally at 22, having a coupling end 24 configured to couple with the rotary hand tool 10, and an enlarged cutting end, indicated generally at 26, disposed at a generally right angle to the coupling end 24.

Figure 7:
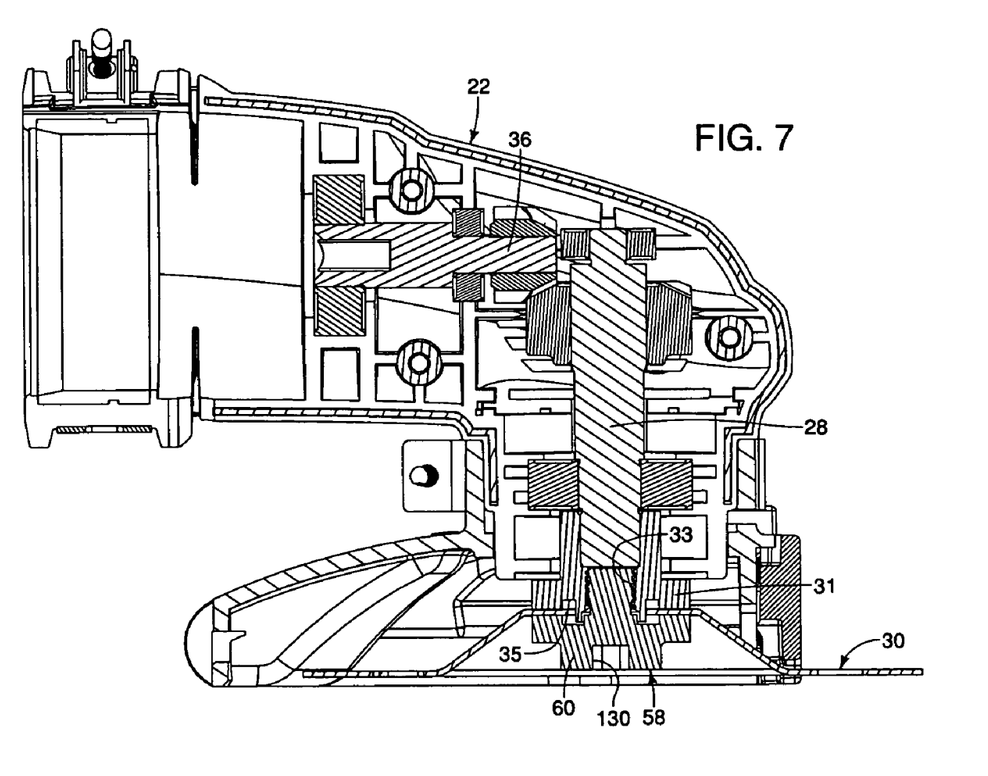
FIG. 7 is a cross section of a portion of the attachment illustrated in FIG. 1, showing the input and output shafts.

The attachment housing 22 is preferably composed of a rugged, impact resistant plastic material and having an output shaft 28 and an input shaft 36 that are interconnected by gears as shown in FIG. 7. The output shaft 28 is configured to drive a rotating tool, such as a rotary saw wheel, indicated generally at 30. The output shaft 28 preferably has an upper flange 31 with a threaded opening 33 for receiving a mounting flange 58 that clamps the wheel 30 to the upper flange 31. The upper flange 31 has an annular recess 35 that is coextensive with a corresponding recess 126 in the mounting flange 58. The upper flange 31 is securely mounted on the output shaft 28 by being press fit thereon. The attachment housing 22 may be made from many materials, such as nylon, ABS, or polypropylene, preferably 33% glass-filled nylon. Preferably, the cutting attachment 20 includes two halves that matingly engage one another in a clamshell engagement to form the single attachment housing 22, though it is contemplated that the attachment housing may be made of a greater or lesser number of parts.

The coupling end 24 of the attachment housing 22 is generally cylindrical in shape, and includes a generally circular opening that is sized and configured to snugly and matingly receive cylindrical nose portion 14 of the rotary hand tool 10. To maintain engagement of the attaching housing 22 to the rotary hand tool, the coupling end 24 also preferably includes a locking mechanism, such as an annular band clamp 32 disposed around an outer circumference thereof. The annular band clamp 32 also preferably includes a cam lock 34 such that the band clamp 32 may be tightened around the outer circumference of the coupling end 24 and then locked into the tightened position.

Coupling of the drive shaft 16 of the rotary hand tool 10 to the input shaft 36 of the cutting attachment 20 may be accomplished in a variety of ways. For example, a drive nut may be coupled to the motor drive shaft 16 which has a hexagonal or square opening that engages a suitable coupling on the input shaft 36 in a manner that assured non slipping rotation, but sliding decoupling when the attachment is removed from the tool 10 as is known to those of ordinary skill in the art. Alternatively, the input shaft 36 of the cutting attachment 20 may have a square or other noncircular configuration. In this manner, the rotary hand tool 10 and cutting attachment 20 are mechanically coupled, with the motor output shaft 16 of the rotary hand tool, and input shaft 36 of the cutting attachment properly aligned.

The enlarged cutting end 26 of the attachment housing 22 is preferably configured to provide a variety of tasks, such as undercutting, flush-cutting, as well as operating as a circular saw when the cutting attachment 20 is used in a vertical or other angled orientation.

To this end, the enlarged cutting end 26 of the attachment housing 22 includes a blade guard, indicated generally at 40, configured to operationally enclose a substantial portion of the rotary cutting wheel 30. While it is contemplated that the blade guard 40 may be unitary with the enlarged cutting end 26 of the attachment housing 22, for purposes of illustration, the blade guard is shown and described as being releasably secured to a nose portion 42 of the enlarged cutting end, such as via a band clamp 44 and cam lock 46. It is further contemplated that alternative locking mechanisms, such as a snap-fit or frictional engagement, may be provided in place of the band clamp 44 and cam lock 46 without departing from the scope of the invention.

The blade guard 40 is preferably bowl-shaped, with a concave portion 48 for containing the rotary cutting wheel 30 therein. A generally ring-shaped collar 50 extends upwardly from a surface of the blade guard 40 opposite the receiving portion to engage the nose portion 42 of the enlarged cutting end 26, and it is around this collar 50 that the band clamp 44 and cam lock 46 are preferably secured to releasably secure the blade guard to the enlarged cutting end.

The rotary cutting wheel 30 is dome-shaped, having a preferably smooth, but segmented annular flange 52 disposed around an outer circumference thereof and having a cutting edge 54 and an offset center hub portion 56. The rotary cutting wheel 30 is designed to cut through wood and small nails, and its configuration enables the attachment 20 to make flush cuts in a work surface. The segmented wheel 30 preferably has tungsten carbide grit bonded to its perimeter surface 54, but not on either side face. Alternatively, a grit containing diamond particles may be bonded to the surface 54.

Figure 8:
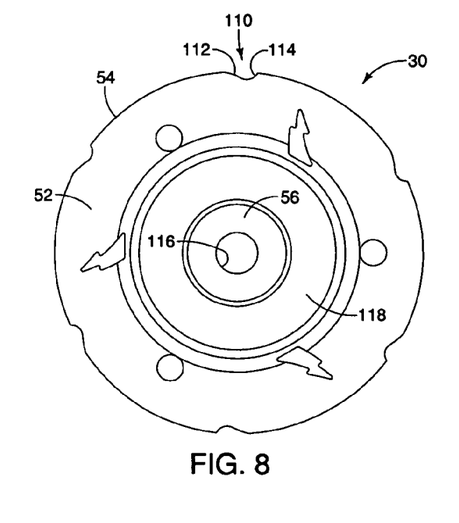
FIG. 8 is a top plan view of the domed cutting wheel of the preferred embodiment of the accessory cutting attachment.
Figure 9:
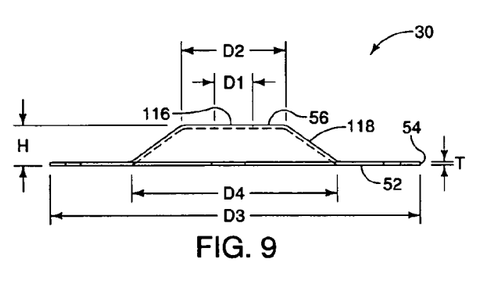
FIG. 9 is a side view of the domed cutting wheel shown in FIG. 8.

The segmented wheel 30 is shown in detail in FIGS. 8 and 9. It is segmented in that it has six dust evacuating recesses 110 equally spaced around its circumference, all of which have a negative rake angle portion 112 that merges with a generally cylindrical portion 114. The negative rake angle portion 112 is provided for safety reasons so that if a user comes in contact with the wheel during operation (and given the fact that the direction of rotation is clockwise as shown in FIG. 8), it will be less likely that an edge will tear the flesh of the user as severely as may otherwise occur. In this regard, if the wheel were rotated in the counterclockwise direction, the intersection of portion 114 with the outer cutting edge 54 presents a sharp corner that could result in severe injury to a user.

The segmented wheel 30 preferably has Tungsten Carbide grit bonded to the outside edge 54, including the negative rake portions 112, but preferably not extending to the side walls or faces of the annular flange portion 52. In this regard, the thickness of the wheel 30 is preferably substantially constant and is preferably made from standard 20 gauge sheet steel which has been found to provide the necessary strength and stiffness during operation. If thinner stock were used, there is a likelihood that instability, warping or bending could occur that would detrimentally affect the quality of cuts that may be made with the wheel 30. Also, the thickness of the annular flange 52 is preferably minimized so that the kerf that is made during the cutting action is minimized. The 20 gauge sheet metal that is preferred has a thickness T of 0.910 +/−0.076 millimeters before painting.

With regard to the kerf, it is greatly preferred that the Tungsten Carbide grit that is bonded to the perimeter not extend to the face because this will significantly increase the kerf. Since this wheel and attachment may be often used with a portable tool that may be driven by a battery pack, it is important that the amount of power required to operate the attachment be minimized to prolong battery life. When Tungsten Carbide grit is bonded to the outer surface, the thickness increases to approximately 1.45 millimeters because of some unavoidable outward extension of the grit. It has been found that if grit were extended along the side faces of the annular flange 52, the thickness is increased to 2.00 millimeters which results in 20% increased power consumption during operation. This necessarily reduces the operating life between charges of a battery pack by a significant amount. It has also been found that when grit is applied only to the edge 54 that a better, smoother cut is produced than that which occurs when grit is applied to the side faces of the flange 52.

It has also been found that the configuration of the wheel for cut off purposes, as contrasted with similarly shaped wheels for performing grinding operations, that effective operation is achieved when the diameter of the center hub 56 (D2 in FIG. 9) is within the range of 20-35% of the overall diameter of the wheel (D3) as shown in FIG. 9. Additionally, the diameter (D1) of an opening 116 be within the range of 10-15% of the overall diameter D3 of the wheel 30. The center hub 56 portion is offset by an amount H as shown in FIG. 9 and it is preferred that this dimension be within the range of 7-13% of the overall diameter D3. The offset H is sufficient to enable the mounting flange 58 which is shown in detail in FIGS. 10 and 11 to fit and not interfere with flush cutting being performed by the wheel 30.

It is preferred that the overall diameter of the wheel be approximately 98 millimeters. It is also preferred that the conical portion 118 be at an angle shown with a base diameter D4 that is approximately 55 millimeters with the center hub diameter being approximately 28 millimeters and the height H being approximately 11 millimeters.

Figure 10:
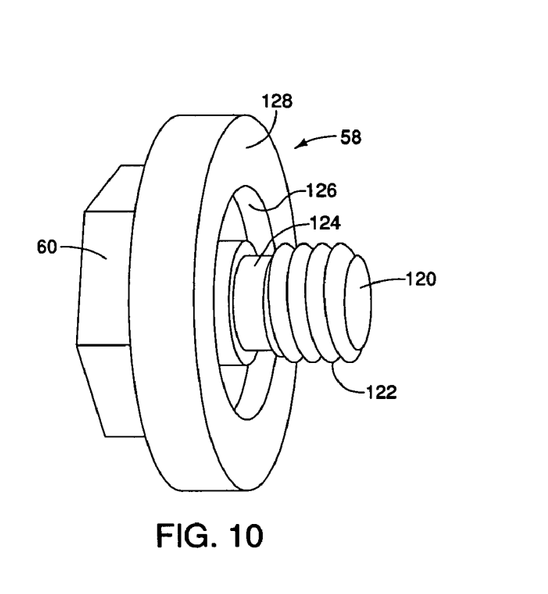
FIGS. 10 and 11 are perspective views of the mounting flange used to attach the cutting wheel shown in FIGS. 8 and 9 to the preferred embodiment of the accessory cutting attachment.
Figure 11:
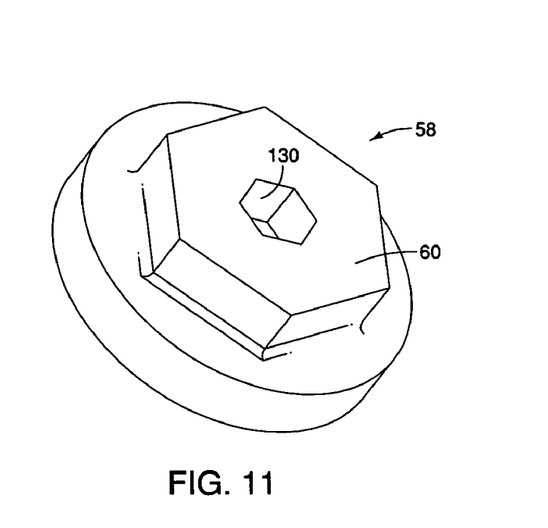

The wheel 30 is mounted on the attachment 20 by the mounting flange 58 which is shown in detail in FIGS. 10 and 11. The mounting flange 58 has a threaded extension 120 that has approximately four threads 122 and a reduced diameter portion 124 that is provided for better termination of the threads 122. It also has an annular cavity 126, which in combination with the annular cavity 35 of the upper flange 31, causes the flanges 58 and 31 to function as relief flanges whereby an annular contact surface 128 (of mounting flange 58 and a similar surface on upper flange 31) is provided for clamping the wheel 30 to the attachment in a ring rather than a disk. This ring clamping configuration is advantageous because it enables the mounting flange 58 and upper flange 31 to be used with an organic reinforced wheel as well as a sheet metal wheel 30 and still comply with the ANSI specifications for cutoff wheels. Such relief flanges that clamp in a ring reduce the likelihood that an organic reinforced wheel 30 will bend or crack. The thickness of the mounting flange 58, i.e., the distance from the surface 128 and the top of the hexagonal mounting portion 60 is preferably approximately 9 millimeters, which is adequate to reliably hold the wheel in the attachment and not extend beyond the plane of the annular flange 52 so as to interfere with flush cutting.

Figures 3A, 3B:
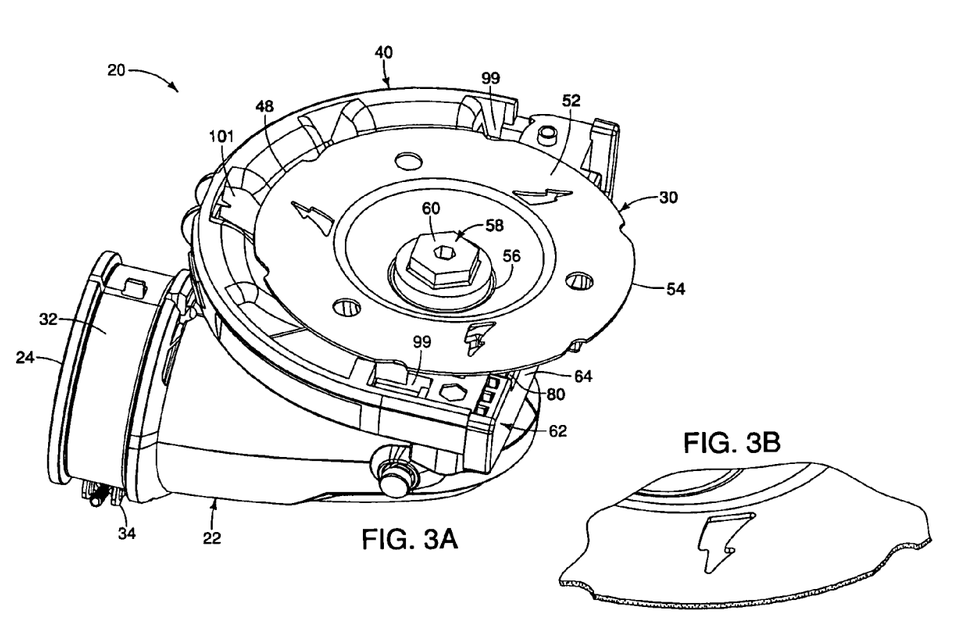
FIG. 3A is a bottom perspective view of the accessory cutting attachment of FIG. 1 without the optional cover.
FIG. 3B is a partial perspective view illustrating grit bonded to the outer edge of the cutting wheel.
Figure 4:
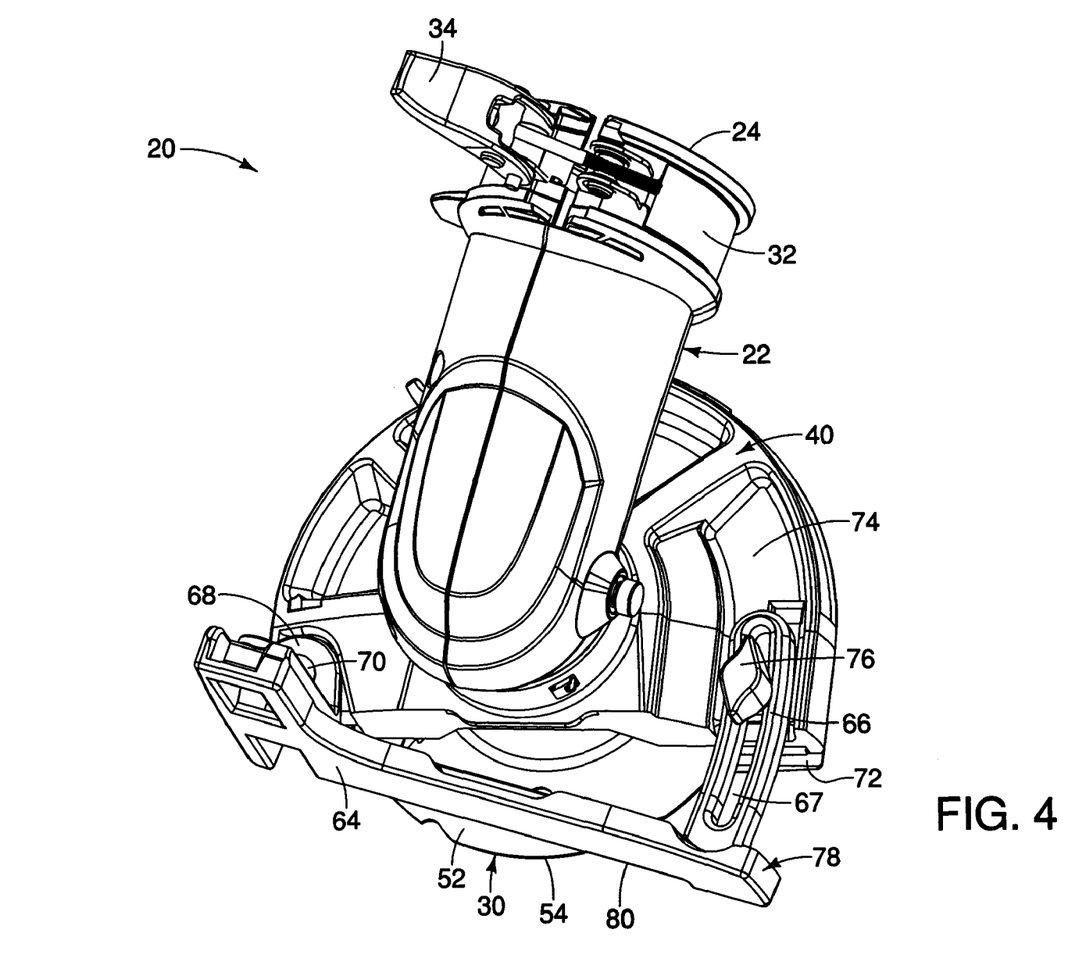
FIG. 4 is a top perspective view of the accessory cutting attachment illustrated in FIG. 1.

As shown in FIG. 11, the hexagonal mounting portion 60 enables a wrench to be used to tighten or loosen the mounting flange 58. It also has a hexagonal recess 130 that enables a hexagonal driver to be used for the same purpose. Such dual drive systems provide more convenience to the user in mounting and removing wheels 30 from the attachment 20. It is also noted that the flange 58 is integrally formed in that the hex mounting portion 60 is preferably formed simultaneously with the larger portion. This portion having the annular face 128 is significantly larger than the size of the hex mounting portion which desirably lowers the stress that is applied to the wheel 30. In this regard, the diameter of the face 128 is preferably only slightly smaller than the size of the center hub 56 of the wheel to maximize the bearing surface applied to the center hub, as illustrated in FIG. 3A. This prevents damage to softer materials by decreasing the pressure applied to the wheel 30 which can be important if the wheel is made of organic or fibrous reinforced material.

It is contemplated that the cutting attachment 20 may be operated at any angle between those designations known to those skilled in the art as "vertical" and "horizontal," where "horizontal" refers to operation of the cutting attachment during undercutting and flush cutting applications where the cutting plane of the wheel is horizontal and the wheel is flush cutting a vertical surface such as a baseboard of a wall, for example. Vertical then means the cutting plane of the wheel is generally perpendicular to a horizontal surface.

The preferred cutting attachment 20 also preferably includes additional features to promote depth of cut adjustment, such as a pivoting foot, designated generally at 62. Advantageously, the preferred pivoting foot 62 promotes a smooth, easy and user-friendly mechanism to determine and maintain a desired depth of cut. The pivoting foot 62 is preferably configured to be pivotably coupled to the blade guard 40 to permit the user to determine and maintain the desired depth of cut.

As illustrated in FIGS. 1-6, the pivoting foot 62 is preferably an elongated member 64 having an elongated extension 66 extending from one end thereof, with the extension having a curved slot 67. At an end of the elongated member 64 opposite the one end having the elongated extension 66, a mounting bracket 68 is provided to fixedly couple the pivoting foot 62 to the blade guard 40. The mounting bracket 68 is secured to the blade guard 40 via a fastener 70, which may include a variety of fasteners, such as a shoulder rivet, a plain rivet with a shaft retainer, a threaded connection or any number of cylindrical-type fasteners, to name a few. The fastener 70 securing the mounting bracket 68 to the blade guard 40 serves as a pivoting point for the pivoting foot 62, whereas the elongated extension 66 is configured to be selectively moveable with respect to the blade guard. By selectively pivoting the pivoting foot 62 about the pivot point defined by the mounting bracket 68, a user may determine the desired cutting depth.

More particularly, at maximum depth of cut, the elongated member 64 is configured to be generally parallel to a generally squared end 72 of the blade guard 40. The blade guard 40 preferably includes a curved channel 74 that is correspondingly configured to promote sliding reciprocation of the elongated extension 66 therein, where the elongated extension may be removably secured into a desired position via engagement of a wing nut 76 or other fastener at a particular position along a length of the curved slot 67. At the maximum depth, the elongated extension 66, with the wing nut 76 coupled to an extreme lower end 78 of the curved slot 67.

The wing nut 76 may be loosened or removed to permit reciprocation of the slot extension 66 relative to the wing nut and the curved channel 74 until the pivoting foot 62 is placed in the desired position to obtain the desired depth of cut. The wing nut 76 is then replaced and/or tightened to lockingly secure the position of the pivoting foot 62 relative the blade guard 40.

The elongated member 64 is preferably configured to have an outwardly facing planar surface that is configured at a lower edge 80 to expose the rotary cutting wheel 30. More particularly, the lower edge 80 includes an opening or aperture to permit extension of the rotary cutting wheel 30 therethrough when the pivoting foot 62 is coupled to the enlarged cutting end 26. Accordingly, as depth of cut is adjusted, increasingly larger portions of top and bottom surfaces of the rotary wheel 30 are exposed via the lower edge 80 of the elongated member 64, thereby promoting correspondingly increasingly larger depths of cut, as determined by the user.

In this manner, the pivoting foot 62 permits the user to determine and maintain a depth of cut from a range of depths, such as from 0" to a maximum of approximately ¾". Advantageously, the outwardly facing planar surface of the pivoting foot 62 may also serve as a stable and secure base during operation of the cutting attachment 20 as a vertical or otherwise angled circular saw. In other words, the cutting attachment 20 may be used as a circular saw.

The pivoting foot 62 may also be optionally configured to include a straight edge guide, indicated generally at 82, which advantageously promotes the accurate cutting of long, straight cuts when the cutting attachment 20 is used in the vertical orientation where there is a guide surface against which the edge guide can follow.

More particularly, the pivoting foot 62 may include a slotted bracket 84 in which to releasably secure the straight edge guide 82. The slotted bracket 84 is generally rectangular in shape, with a generally rectangular passage 86 therethrough.

Figure 5:
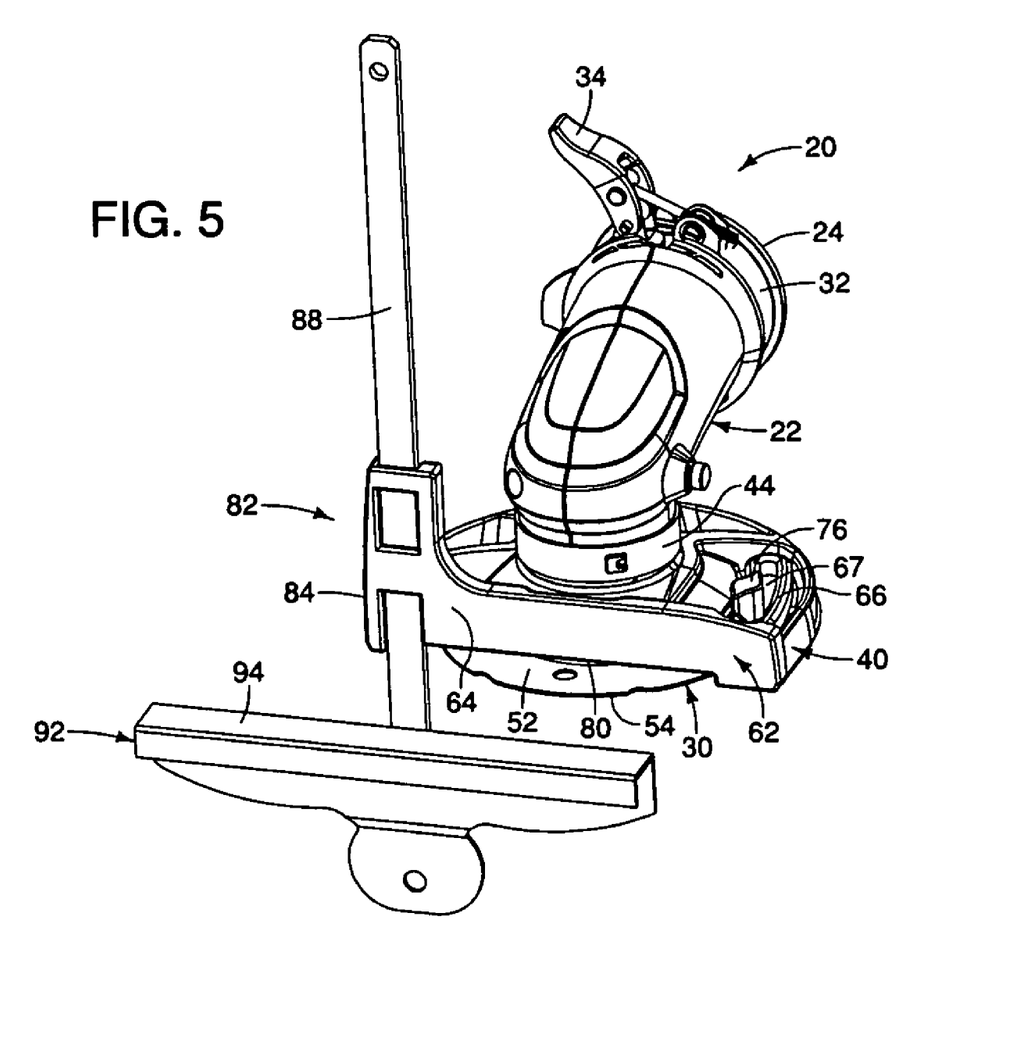
FIG. 5 is a front perspective view of the accessory cutting attachment illustrated in FIG. 1 shown with a straight edge guide.
Figure 6:
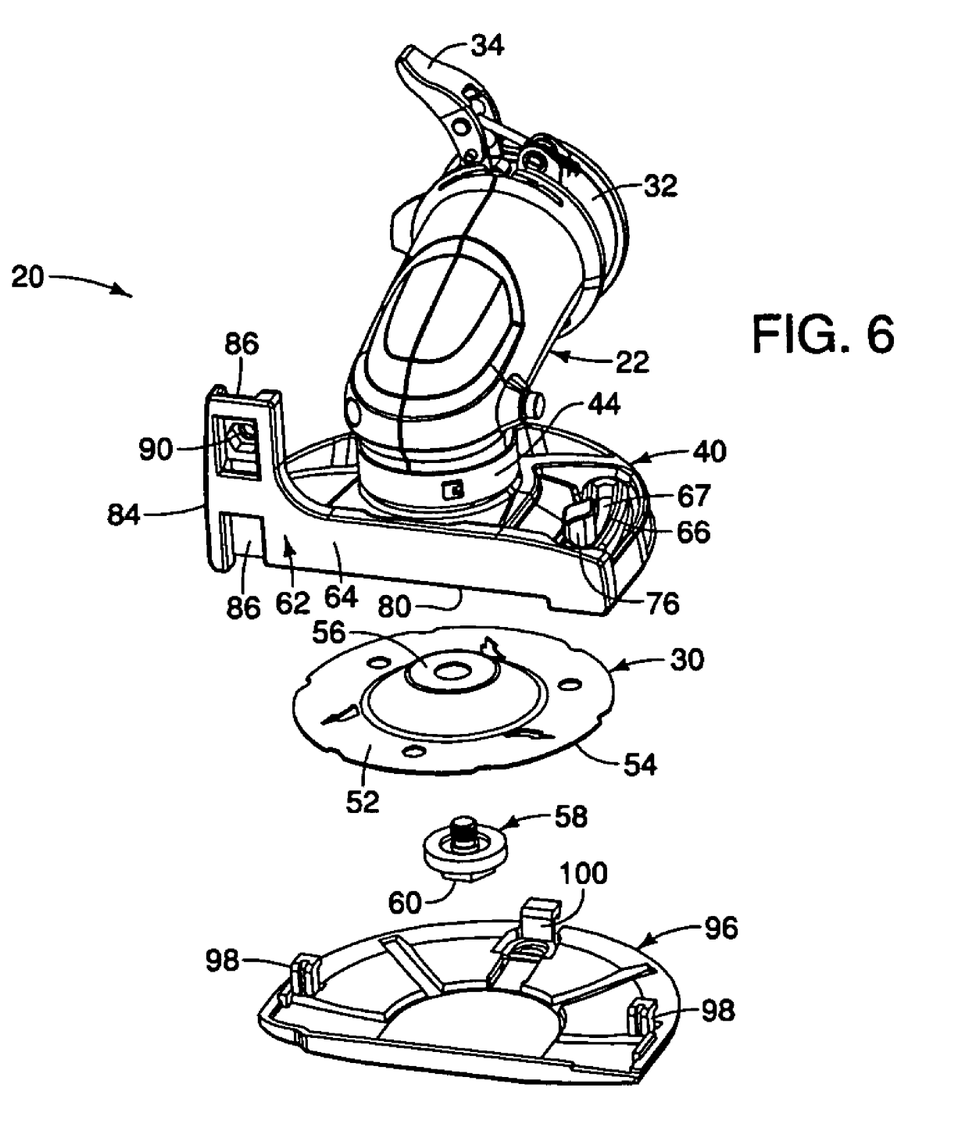
FIG. 6 is an exploded front perspective view of the accessory cutting attachment illustrated in FIG. 1.

It is contemplated that the slotted bracket 84 may be configured to receive a straight edge guide such as the straight edge guide 82 shown in FIG. 5. When provided, the straight edge guide 82 includes a generally rectangular, elongated member 88 that is configured to fit in the rectangular passage 86 of the slotted bracket 84 and be slidable with respect thereto. An orifice 90 disposed within the rectangular passage 86 is configured to receive a threaded fastener (not shown) that can be tightened when the straight edge guide 82 is properly positioned. Thus, the elongated member 88 may be slidably moved within the rectangular passage 86 until the desired position is achieved, at which point the fastener is tightened within the orifice 90 and holds the straight edge guide 82 in the desired position.

The straight edge guide 82 also preferably includes an alignment member, indicated generally at 92, for alignment with an edge of the work piece to be cut. For example, when the cutting attachment 20 is used in the vertical position, a generally planar surface 94 of the alignment member 92, which is oriented to be generally parallel with the annular flange 52, abuts the work piece to guide the rotary cutting wheel 30 in a linear cutting path parallel to the planar surface of the alignment member.

The preferred cutting attachment 20 may also optionally include a removable cover, designated generally at 96, to protect the user from injury when the cutting attachment 20 is operated in the vertical orientation. The cover, indicated generally at 96, and the blade guard 40 are configured to engage one another such that the cover and blade guard at least partially sandwich the rotary cutting wheel 30 therebetween. The preferred cover 96 includes a pair of diametrically opposed hooks 98 extending upwardly from a surface of the cover oriented to face the rotary cutting wheel 30, as well as a locking member 100 extending upwardly from the surface of the cover oriented to face the rotary cutting wheel toward an outer edge thereof, and at a position intermediate the pair of hooks 98.

In the closed position, the hooks 98 engage correspondingly configured locking recesses with shelves 99 disposed on opposite sides of the blade guard 40, and the locking member 100 releasably clamps to a surface in another recess 101 located near the mounting end portion of the of the blade guard. On an external surface 102 of the cover 96, corresponding to the location of the locking member 100, is a release button 104 which, when depressed, releases the clamping force of the locking member, thereby permitting the user to quickly and easily disengage the cover 96 from the blade guard 40.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. An accessory attachment for a rotary power hand tool of the type which has a tool housing with a nose portion, a motor having a motor drive shaft with a mounting coupling extending forwardly from the nose portion for receiving a drive shaft, said attachment comprising:
   a housing having first and second end portions, said first end portion configured to be mounted to the tool housing nose portion and an input shaft for coupling to the motor drive shaft, said second end portion oriented at an angle relative to said first end portion and having an output shaft coupled to said input shaft at an angle relative thereto;
   a rotary cutting wheel mounted to said output shaft and substantially disposed within said second end portion, excepting an exposed portion of said rotary cutting wheel for engaging a work surface;
   a mounting flange for clamping said rotary cutting wheel to said output shaft of said accessory attachment, said mounting flange having a hexagonal mounting portion, an enlarged flange portion having a contacting surface, a threaded extension with a threaded end portion, said flange portion being integrally formed with the hexagonal mounting portion and
   a removable cover configured to engage said second end portion to at least partially enclose said rotary cutting wheel therebetween.

2. The accessory attachment of claim 1 wherein said removable cover and said second end portion being configured to releasably and lockingly engage one another.

3. The accessory attachment of claim 1 wherein said rotary cutting wheel further comprises a dome-shaped wheel having an annular cutting flange and a recessed hub.

4. The accessory attachment of claim 3 wherein said second end portion further comprises a correspondingly dome-shaped outer configuration and encloses a substantial portion of said rotary cutting wheel therein.

5. The accessory attachment of claim 1 wherein said cover has at least two hooks located on opposite sides of the wheel, each of which engage a recess in said second end portion, and a locking member for engaging a third recess in said second end portion.

6. The accessory attachment of claim 5 further comprising a release button operatively connected to said locking member, said release button releasing the clamping force of the locking member when said release button is pressed.

7. The accessory attachment of claim 1 wherein said rotary cutting wheel comprises a dome-shaped cutting wheel having a recessed hub portion with a flat center hub portion in which a mounting opening is located and an annular outer flange, said annular flange having side faces and an outer peripheral cutting surface.

8. The accessory attachment of claim 7 wherein said outer peripheral surface has tungsten carbide grit bonded thereto.

9. The accessory attachment of claim 7 wherein said annular flange has a first predetermined diameter, said center hub portion has a second predetermined diameter, said mounting opening has a third predetermined diameter, said annular outer flange has a predetermined thickness and the plane of said center hub portion is displaced from the plane of said outer flange by a predetermined height.

10. The accessory attachment of claim 9 wherein said predetermined height is within the range of about 7 to about 13% of said first predetermined diameter.

11. The accessory attachment of claim 9 wherein said second predetermined diameter is within the range of about 20 to about 35% of said first predetermined diameter.

12. The accessory attachment of claim 9 wherein said third predetermined diameter is within the range of about 10 to about 15% of said first predetermined diameter.

13. The accessory attachment of claim 9 wherein said first predetermined diameter is about 98 millimeters.

14. The accessory attachment of claim 9 wherein the predetermined thickness of said outer flange is about 0.91 millimeters and said wheel is made from steel.

15. An accessory attachment for a rotary power hand tool of the type which has a tool housing with a nose portion, a motor having a motor drive shaft with a mounting coupling extending forwardly from the nose portion for receiving a drive shaft, said attachment comprising:

a housing having first and second end portions, said first end portion configured to be mounted to the tool housing nose portion and an input shaft for coupling to the motor drive shaft, said second end portion oriented at an angle relative to said first end portion and having an output shaft coupled to said input shaft at an angle relative thereto;

a rotary cutting wheel mounted to said output shaft and substantially disposed within said second end portion, excepting an exposed portion of said rotary cutting wheel for engaging a work surface; wherein said rotary cutting wheel comprises a dome-shaped cutting wheel having a recessed hub portion with a flat center hub portion in which a mounting opening is located and an annular outer flange, said annular flange having side faces and an outer peripheral cutting surface;

a removable cover configured to engage said second end portion to at least partially enclose said rotary cutting wheel therebetween; and a mounting flange for clamping said rotary cutting wheel to said output shaft of said accessory attachment, said mounting flange having a hexagonal mounting portion, an enlarged flange portion having a contacting surface, a threaded extension with a threaded end portion, said flange portion being integrally formed with the hexagonal mounting portion.

16. The accessory attachment of claim 15 further comprising an annular cavity in said flange portion which causes said contacting surface to be ring shaped.

17. The accessory attachment of claim 15 further comprising a reduced diameter portion between said threaded end portion and said flange portion.

18. The accessory attachment of claim 15 further comprising a hexagonal recess formed in said hexagonal mounting portion.

19. The accessory attachment of claim 15 wherein the outer diameter of said flange portion is substantially the size of said center hub portion of said wheel.

20. A mounting flange for clamping a rotary cutting wheel to an output shaft of an accessory attachment, said mounting flange comprising:

a hexagonal mounting portion, an enlarged flange portion having a planar contacting surface, an annular cavity in said flange portion wherein the flange portion defines a wide ring shaped contacting surface that is configured to contact a cutting wheel, a threaded extension with a threaded end portion extending outwardly with respect to the flange portion and opposite the hexagonal mounting portion, said flange portion being integrally formed with the hexagonal mounting portion, a reduced diameter portion between said threaded end portion and said flange portion.

21. The mounting flange of claim 20 further comprising a hexagonal recess formed in said hexagonal mounting portion.

* * * * *